N. D. CRAWFORD.
HOLLOW RUBBER ARTICLE AND PROCESS OF PRODUCING SAME.
APPLICATION FILED SEPT. 29, 1915.
1,190,731.
Patented July 11, 1916.
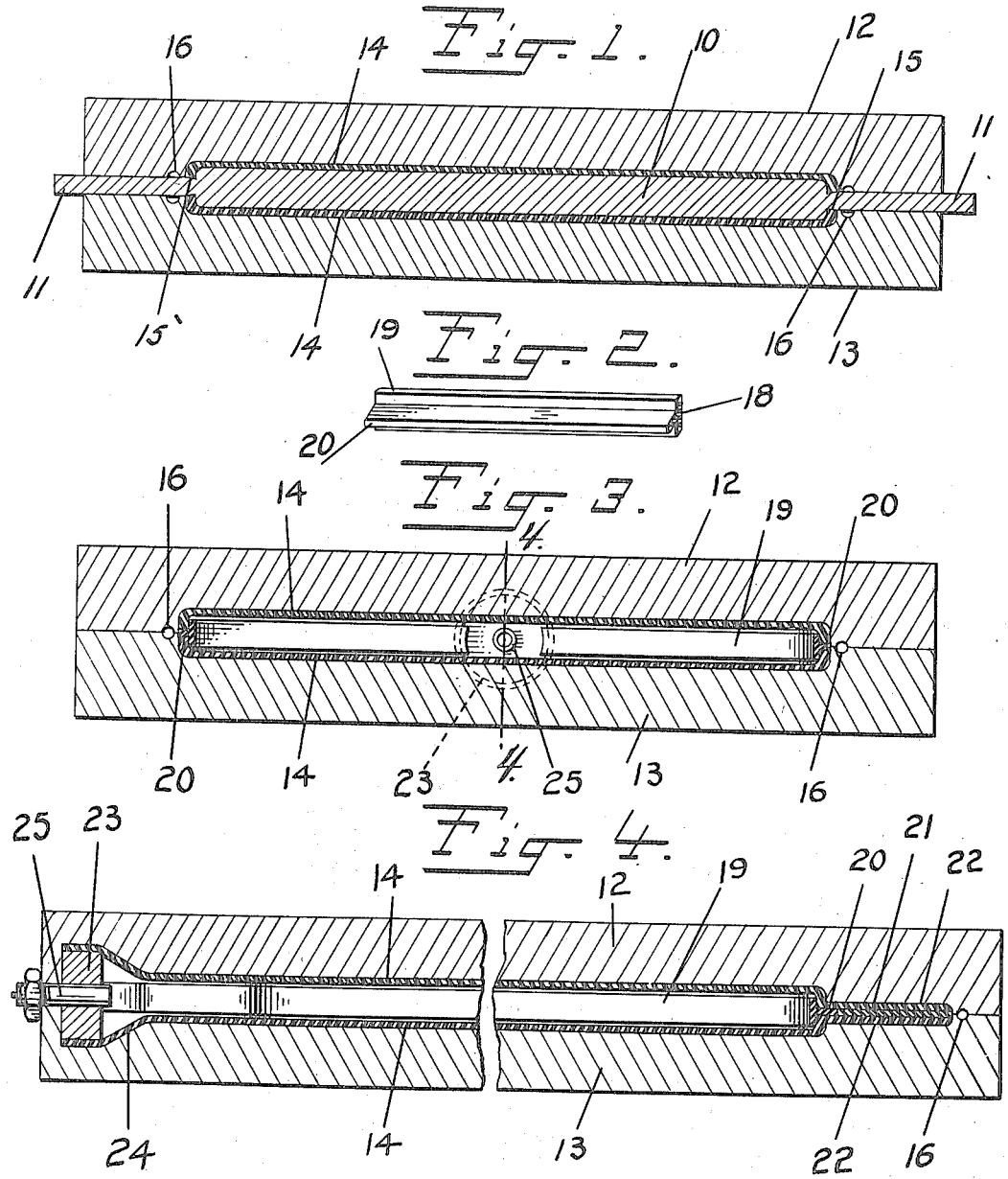
WITNESS:
INVENTOR
Neil D. Crawford,
BY
HIS ATTORNEY

UNITED STATES PATENT OFFICE.

NEIL D. CRAWFORD, OF ELIZABETH, NEW JERSEY, ASSIGNOR TO THE MECHANICAL RUBBER COMPANY, A CORPORATION OF NEW JERSEY.

HOLLOW RUBBER ARTICLE AND PROCESS OF PRODUCING SAME.

1,190,731.   Specification of Letters Patent.   Patented July 11, 1916.

Application filed September 29, 1915. Serial No. 53,190.

*To all whom it may concern:*

Be it known that I, NEIL D. CRAWFORD, a citizen of the United States, residing at Elizabeth, county of Union, and State of New Jersey, have invented certain new and useful Improvements in Hollow Rubber Articles and Processes of Producing Same, of which the following is a full, clear, and exact description.

This invention relates to hollow rubber articles, more particularly to molded water bottles.

The object of the present invention is to provide a process for manufacturing rubber water bottles and the like without the use of a core during final vulcanization.

A further object is to provide an article of this type which will be devoid of seams at the meetings of the walls and will furthermore be reinforced against leakage and breaking away at the joints.

It is customary in the manufacture of rubber water bottles and like articles to shape the rubber material in a raw state upon a core and inclose the same in a mold to which heat is applied to vulcanize the article. Subsequently, the core must be withdrawn from the vulcanized article and this is usually accomplished through an extended opening in some point in the wall of the article. After withdrawal of the core this opening must be sealed and for this purpose cement is usually employed. However, it is well known in the rubber art that cement applied to a seam or joint does not form as strong or permanent a union as is desired and that leaks are liable to occur at the cemented portions.

To overcome the above described disadvantages I form both the exterior and interior surfaces of the article by molding, but remove the core from the article and mold prior to final vulcanization. As a result, the parts are integrally united throughout their contacting portions without the necessity of puncturing and subsequently sealing attendant upon removal of a core after vulcanization of the article.

The invention can be readily understood from the following description taken in connection with the accompanying drawing, in which—

Figure 1 is a cross-sectional view showing the mold, core, and the article confined between these parts; Fig. 2 is a fragmentary perspective view of the binder strip used to unite the parts of the article; Fig. 3 is a cross-sectional view showing the mold with the article confined therein after withdrawal of the core ready for final vulcanization; Fig. 4 is a longitudinal sectional view on the line 4—4, Fig. 3.

Referring now to the drawing, in which like characters of reference designate similar parts, apparatus is shown for carrying out my improved process, the same comprising a core 10 which is of the general contour of the article to be formed and is provided marginally with a flange 11 which extends in the central plane of the core and projects sufficiently beyond the boundary of the core to separate the sections 12 and 13 of the mold. The mold sections have an inner configuration similar to the configuration of the core, and serve in conjunction with the core to impart the desired shape to the article, the rubber materials 14 for which, in a green or raw state, have been previously laid on the core in the usual manner prior to the same being inclosed in the mold. The sides of the flange 11 near the body of the core are tapered inwardly toward the body of the core for a distance equal to the thickness of the rubber material as shown at 15, this being for the purpose of forming beveled confronting edges 15' on the rubber materials confined between the mold sections and core. Grooves 16 are formed on the mold sections to receive the overflow of the material and to cut a sharp edge upon the material of the article.

The rubber materials 14 are partially vulcanized while confined between the core 10 and mold sections 12 and 13 by placing the mold and contents in a vulcanizer for a sufficient period of time and subjecting the same to a sufficient temperature to effect the the desired degree of vulcanization in the rubber. After completion of the partial vulcanizing step, the mold sections are separated and the rubber materials, which have attained such consistency as to be somewhat self-supporting and shape-retaining, are stripped from the core and are then assembled as will now be described.

The binder strip 18 of quick curing rubber stock and of substantially T-shaped cross-section, including a band 19 of the general configuration of the marginal contour of the article to be formed, and a flange 20 projecting outwardly at a right angle from the center of the band, is positioned with the flange bearing between the confronting beveled edges 15' of the shaped rubber sections 14 of the article, and with the band 19 lying within the interior of the article and close up against the inner faces of the sections near the beveled edges. The binder strip thus positioned forms a splice which bridges the gap between and connects both rubber sections, the band of the strip reinforcing the joint to resist separation, while the tapered connection of the edges 15' of article and flange 20 of the strip forms a strong joint devoid of leaky places. A rubber strip 21 of the same stock as the binder strip is placed between the tail portions 22 of the article so as to form a solid body of rubber at that point. To complete assembling, a block 23 is inserted in the neck 24 of the article, the block being equipped with a valve 25 of ordinary construction, which establishes communication between the interior and exterior of the article.

The parts of the article assembled as above described, are now placed again between the mold sections 12 and 13 and the mold with its contents again placed in a vulcanizer and subjected to a sufficient temperature for a sufficient period of time to effect final vulcanization. To maintain the material snug against the walls of the mold sections, the article is inflated by connecting the valve 25 to any suitable source of air or other pressure medium, and the pressure medium is maintained within the article during final vulcanization. After vulcanization, the mold is removed from the vulcanizer and the vulcanized rubber article removed from the mold, after which valve 25 and block 23 may be removed from the article and the usual attachments for the neck of an article of this character applied in any usual or preferred manner.

From the above description it will be seen that I have provided a process whereby a molded hollow rubber article may be vulcanized without the use of an interior core, and furthermore it will be seen that the article produced by this process is devoid of seams at the joints and that the joints are reinforced against leakage and separation.

While I have described and illustrated one particular embodiment of my invention, I do not limit myself to the constructions or sequence of operations illustrated and described, it being understood that modifications may be resorted to within the scope of the appended claims, without departing from the spirit or sacrificing any of the advantages of the invention.

What is claimed is:

1. The process of making hollow rubber articles consisting of partially vulcanizing rubber sections of the article while maintaining the borders thereof spaced from each other, then assembling the partially vulcanized sections with an intervening strip of vulcanizable rubber therebetween, and then completing vulcanization of the assembled article while maintaining the same externally confined and yieldably pressed outwardly in all directions from the interior.

2. The process of making hollow rubber articles consisting of partially vulcanizing rubber sections of the article while maintaining the borders thereof spaced from each other, then assembling the partially vulcanized sections with an intervening strip of vulcanizable rubber therebetween, and then completing vulcanization of the assembled article with pneumatic pressure upon the inside of the article and with the outside of the article rigidly confined.

3. The process of making hollow rubber articles consisting of rigidly supporting the exterior and interior of rubber sections of the article with their borders in spaced relation, partially vulcanizing the sections while thus supported, assembling the partially vulcanized sections with a strip of vulcanizable rubber therebetween, and completing vulcanization of the assembled article supported rigidly upon its exterior surface and yieldably pressed outwardly in all directions from its interior.

4. A hollow rubber article comprising body sections and a binder strip integrally united therewith and having a band disposed in contact with the inner surface of meeting sections of the article, and a flange projecting outwardly at an angle from the band and disposed in contact with confronting edges of the sections.

Signed at New York, county and State of New York, this 6th day of August, 1915.

NEIL D. CRAWFORD.